April 28, 1931.  H. L. BUDD  1,802,999
PICTURE FRAME PANEL
Filed Feb. 4, 1930
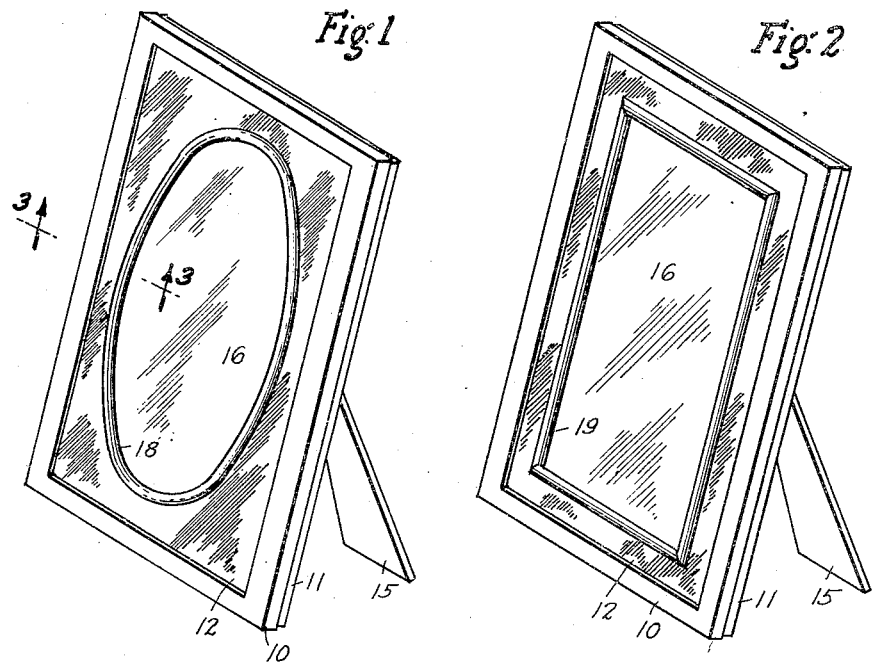
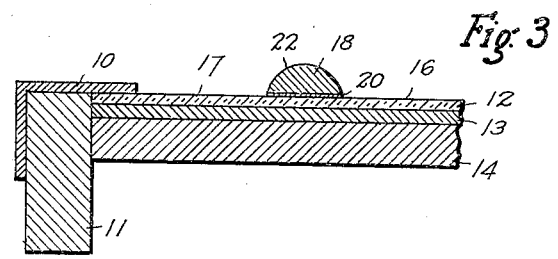
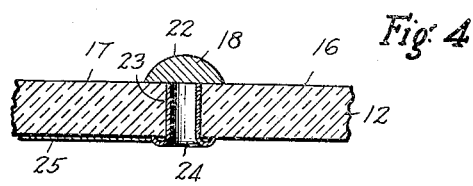
INVENTOR
Howard L. Budd
BY
*Harry Jacobson*
ATTORNEY Patented Apr. 28, 1931

1,802,999

UNITED STATES PATENT OFFICE

HOWARD L. BUDD, OF BROOKLYN, NEW YORK, ASSIGNOR TO FRIEDMAN SILVER CO., INC., OF BROOKLYN, NEW YORK, A CORPORATION OF NEW YORK

PICTURE-FRAME PANEL

Application filed February 4, 1930. Serial No. 425,760.

This invention relates to ornamental picture frames and the like and contemplates the provision of a panel for differentiating between adjacent exposed visible areas at the front of the frame, without the necessity for connecting the periphery of the panel or the panel forming member to the frame itself.

My invention further contemplates the provision of means independent of the frame for dividing or segregating a contrasting exposed area from the remaining exposed area at the front of the frame, so that various ornamental effects may be obtained, and for defining a clear line of demarcation between the areas.

The various objects of my invention will be clear from the description which follows, and from the drawings, in which, Fig. 1 is a perspective view of one form of my invention wherein the panel member which defines the limits of the exposed areas may be formed of a single piece of material.

Fig. 2 is a similar view of the same, showing a modified form of my invention wherein the panel member is of different polygonal outline.

Fig. 3 is a section of a portion of a frame, taken on the line 3—3 of Fig. 1, and to which my invention has been applied, and Fig. 4 is a similar section, showing a modified form of attaching means for the panel member.

In that form of my invention which I have illustrated by way of example, the frame 10 may be of any of the usual types being illustrated as of L-shaped cross-section, made of metal, and rectangular in outline, though it will be understood that my invention may be applied to any type or shape of frame, provided with the usual transparent protecting member fitted into the frame.

Into the frame 10 may be frictionally inserted the inner rim frame 11 of the usual type, and into said rim is inserted a transparent protecting member such as the glass 12, as well as the picture 13 and the back 14 for holding the parts in place. Said back may carry the easel 15, if desired, in the usual manner and serves the usual function. It will be understood that when I refer to a glass, I mean a partly or entirely transparent member, whether flat or shaped or curved on its front surface, and of sufficient rigidity to act as a protection for the picture, which is visible through the transparent part thereof.

Attempts have heretofore been made to divide the transparent member exposed at the front of the frame into distinct or contrasting panels by means of a panel forming member or rim. Such panel rims, however, have heretofore had no means of support other than by that provided by their indirect attachment to the frame 10. The attaching means heretofore in use had to extend across and obstruct the outer area surrounding the panel and therefore could not provide a clear and unobstructed outer area.

By means of my invention, however, I am able to provide an inner transparent panel area 16 through which the desired amount of the picture 13 is exposed and framed, and an outer area 17, both completely unobstructed and completely exposed to view and separated or segregated by means of a suitable panel forming strip such as 18 or 19, which serves to define the limits of the areas as well as forming a secondary frame for the picture. The panel area 16 and the surrounding area 17 are differentiated, as for example, by leaving the area 16 of the glass 12 transparent while making the area 17 opaque in any suitable manner, as for example, by painting the back of the glass outside of the panel strip with a layer of paint 25 (Fig. 4) or by cementing or otherwise securing a sheet of the desired color and shape to the back surface of the glass.

For supporting the panel or secondary frame strips 18 and 19 independently of the frame 10, I prefer to secure said strip or strips directly to the glass at the proper points by any suitable means, such as for example, the cementitious material 20. I may use any suitable cement or glue impervious to moisture and which will hold metal firmly to glass for the purpose of holding the panel strip in place. Said cementing material may take the form of celluloid cement, which is celluloid dissolved in benzol, acetone, butyl acetate or any other volatile celluloid solvent.

Such cement is not affected by moisture or varying atmospheric conditions, and I have found that it adequately serves the purpose of holding the metal panel strip securely in place to the glass, or other transparent member under normal varying climatic condition, and taking little time to dry.

As illustrated, the panel strip 18 is partly arcuate or elliptical in cross-section and partly flat, but it will be understood that it may be made of any desired cross-sectional shape as may be found convenient or desirable, and that the surface 22 thereof may be ornamented. The strip may be cast or rolled with the ornamentation therein, or engraved, painted, printed, coated, covered or the like, to give the desired ornamental effect. It will further be understood that while I prefer to make the panel strips 18 or 19 of metal, said strips may be made of any other suitable material for ornamental purposes as may be found desirable.

The entire area 17 surrounding the panel strip, and between the panel strip and the frame is unobstructed and exposed to view and therefore may be provided with suitable ornamentation of any desired type.

For example, such ornamentation may consist of designs painted, carved or otherwise formed on or in the back or front of the glass, or it may consist of material of the desired ornamental form secured to the front or back of the area 17 in a manner which is more or less well known in the art, or in the same manner as the panel strip itself is secured to the glass, or the glass may be ornamented in the same manner as the panel strip is ornamented.

Referring now to Fig. 4, I have there shown a modified form of means for securing the panel strip to the outer face of the glass 12. As illustrated, a suitable series of holes as 23 may be drilled in the glass through which may be passed eyelets or rivets as 24. The rivet 24 is secured to the panel strip 18 in any suitable manner as by means of soldering or the like, or if solid rivets are used, said rivets may be passed completely through the strip 18, and the exposed heads finished off.

It will be seen that I have provided an improved picture frame wherein the glass may be divided into segregated areas by means of a panel strip secured directly to the glass, and forming a secondary frame for the picture, said areas being entirely unobstructed and provided with suitable ornamentation as desired.

It will further be seen that since the panel strip is independent of the frame, a much more pleasing appearance is presented than has been heretofore possible with panel strips, in which obstructing connecting members have been used to support the panel strip by attachment thereof to adjacent parts of the frame.

While I have shown and described certain specific embodiments of my invention, I do not intend to be understood as limiting myself thereto but intend to claim my invention as broadly as may be permitted by the state of the prior art and the terms of the appended claims.

I claim:

1. The combination with a picture frame, of a rim fitted into the frame, a plate of glass inserted into the rim, a picture, a back holding the picture in contact with the glass, a metallic panel forming strip of closed outline dividing the exposed area of the glass into an inner panel area and an outer area, said areas being clear and unobstructed, and means for securing the panel strip to the outer exposed surface of the glass comprising a layer of cementitious material permanently adhering to glass and metal and unaffected by moisture.

2. The combination with a metallic picture frame, L-shaped in cross-section, of a rim inserted into said frame, a glass member inserted into said rim and having its front surface exposed at the front of the frame, a back fitted into the rim for holding said glass member in position within the rim, a picture interposed between the back and the glass and held by the back in contact with the rear face of the glass, and means for dividing the front surface of the glass member into independent areas completely unobstructed to view, comprising a metallic member of less thickness than its width of substantially semi-circular cross-section and shaped to form a geometric figure of closed outline arranged on the front surface of the glass member interiorly of the frame and independently thereof, and a layer of celluloid cement securing said metallic member directly to the glass member.

3. In a picture frame, a substantially rigid member of transparent material fitted thereinto, a metallic panel strip of closed outline and of substantially semi-circular cross-section secured to said member and dividing the exposed face thereof into an inner transparent panel area and an outer area, a thin opaque coating on the rear face of the transparent member at the outer area, for rendering said outer area opaque and contrasting with the panel area, and a layer of celluloid cement fixing the strip to the front face of the transparent member.

4. In a picture frame, a substantially rigid member of transparent material and having its front face exposed in the frame, a back member, a picture between the transparent member and the back member held by said back member in contact with the rear face of the transparent member, and means for limiting the amount of the picture visible through the transparent member and for presenting a contrasting unobstructed surface to view about the exposed part of the picture, comprising a metallic panel strip secured to the transparent member independently of the frame, a thin, opaque, coating on the rear face of the transparent member outwardly of the panel and visible through the transparent member for rendering the area surrounding said panel strip opaque and contrasting with the area inside of said strip, and celluloid cement securing the panel strip to the front face of the transparent member.

5. The combination with a metallic picture frame, of a glass member inserted thereinto, a picture arranged rearwardly of said member, a back fitted into said frame for holding the picture in place in pressed contact with the glass member, part of said glass member being transparent to permit part of the picture to be seen therethrough, means for rendering the remainder of the glass member comparatively opaque and of contrasting appearance with the transparent part, a metallic member arranged between the transparent part of the remaining part of the glass member independently of the frame, and celluloid cement for securing said metallic member to the glass member.

6. The combination with a metallic picture frame L-shaped in cross-section, of an annular rim framing an opening in the rim and frictionally fitted into the frame and in contact therewith, a removable transparent member of the size and shape of the rim opening fitted into said opening, the front face of said member being exposed at the front of the rim and engaging the frame in the operative position thereof, a removable back of the size and shape of said rim opening and of the glass member fitted into the rim, and maintaining the transparent member in pressed engagement with the frame against rearward displacement and removal until the back is removed, a metallic panel strip arranged on the front face of the transparent member inwardly of the peripheral edges of said member, the frame, and the back, a thin, opaque coating on the rear face of the transparent member outwardly of said strip and visible through the transparent member for rendering the area surrounding the panel strip opaque and contrasting with the area inside of the strip, and means for securing the panel strip to the transparent member independently of the frame.

7. The combination with a metallic picture frame L-shaped in cross-section, of an annular rim framing an opening in the rim and frictionally fitted into the frame and in contact therewith, a removable transparent member of the size and shape of the rim opening fitted into said opening, the front face of said member being exposed at the front of the rim and engaging the frame in the operative position thereof, a removable back of the size and shape of said rim opening and of the glass member fitted into the rim, and maintaining the transparent member in pressed engagement with the frame against rearward displacement and removal until the back is removed, a metallic panel strip arranged on the front face of the transparent member inwardly of the peripheral edges of said member, the frame, and the back, a thin, opaque coating on the rear face of the transparent member outwardly of said strip and visible through the transparent member for rendering the area surrounding the panel strip opaque and contrasting with the area inside of the strip, and means for securing the panel strip to the transparent member independently of the frame comprising fasteners secured to the strip and passing through the transparent member.

8. The combination with a metallic picture frame, of a glass member removably fitted into said frame, a removable back for maintaining the glass member in operative position, a metallic panel strip arranged on the front face of the glass member inwardly of the peripheral edges of said member, the frame, and the back, and fasteners passing through the glass member and headed on the rear face thereof, and secured to the strip for securing the strip to the glass member.

HOWARD L. BUDD.